Oct. 7, 1958  J. W. MILLER ET AL  2,855,031
VAPORIZING OIL BURNER
Filed Aug. 24, 1953  6 Sheets-Sheet 1

INVENTORS
JOHN W. MILLER &
FREDERICK T. STONEY.
BY
Barnes, Kisselle, Laughlin & Raisch
ATTORNEYS.

Oct. 7, 1958  J. W. MILLER ET AL  2,855,031
VAPORIZING OIL BURNER

Filed Aug. 24, 1953  6 Sheets-Sheet 2

INVENTORS
JOHN W. MILLER &
FREDERICK T. STONEY.
BY
Barnes Kisselle Laughlin & Raisch
ATTORNEYS.

INVENTORS
JOHN W. MILLER &
FREDERICK T. STONEY.
BY
Barnes, Kisselle, Laughlin & Raisch
ATTORNEYS.

Oct. 7, 1958   J. W. MILLER ET AL   2,855,031
VAPORIZING OIL BURNER
Filed Aug. 24, 1953   6 Sheets-Sheet 4

INVENTORS
JOHN W. MILLER &
FREDERICK T. STONEY.
BY Barnes, Kisselle, Laughlin & Raisch
ATTORNEYS.

Oct. 7, 1958   J. W. MILLER ET AL   2,855,031
VAPORIZING OIL BURNER
Filed Aug. 24, 1953   6 Sheets-Sheet 5

INVENTORS
JOHN W. MILLER &
FREDERICK T. STONEY.
BY
ATTORNEYS.

Oct. 7, 1958

J. W. MILLER ET AL 2,855,031

VAPORIZING OIL BURNER

Filed Aug. 24, 1953

INVENTORS
JOHN W. MILLER &
FREDERICK T. STONEY.
BY
Barnes, Kisselle, Laughlin & Raisch
ATTORNEYS.

United States Patent Office 2,855,031
Patented Oct. 7, 1958

2,855,031

VAPORIZING OIL BURNER

John W. Miller and Frederick T. Stoney, Lansing, Mich., assignors to Motor Wheel Corporation, Lansing, Mich., a corporation of Michigan Application August 24, 1953, Serial No. 376,094

11 Claims. (Cl. 158—91)

This invention relates to a vaporizing oil burner.

Vaporizing oil burners are old and well known in the art, see, for example, Valjean Patent 2,073,270 and the Hill Patent 2,535,923.

It is an object of this invention to improve upon this type of vaporizing oil burner so that it will burn with an unusually clean fire substantially throughout the low, intermediate, and high fire stages of combustion and also so that it will burn with a clean fire with any type of fuel oil on the market today, such as the straight run distillate fuel oils or catalytically cracked distillate fuel oils.

This invention contemplates a vaporizing type oil burner that will burn liquid fuel substantially throughout the low, intermediate, and high fire stages of operation with a fire that is substantially cleaner and more efficient than attained heretofore by the vaporizing type oil burners of the prior art.

The invention generally contemplates a vaporizing type oil burner pot in which the fuel is admitted to an annular channel around the bottom of the pot and caused to vaporize and mix thoroughly with primary air at a relatively low temperature to form a mixture which flows upwardly in the pot where secondary air is supplied for combustion. A baffle is provided near the bottom of the burner pot which shields the oil in the annular channel from direct radiant heat from the burning mixture at the upper end of the pot. This baffle is arranged with respect to the lower primary air inlets so as to promote vaporization and an intimate mixing of the oil with air immediately after vaporization and at a relatively low temperature.

Referring to the drawings wherein several embodiments of the invention are illustrated:

Figure 1:
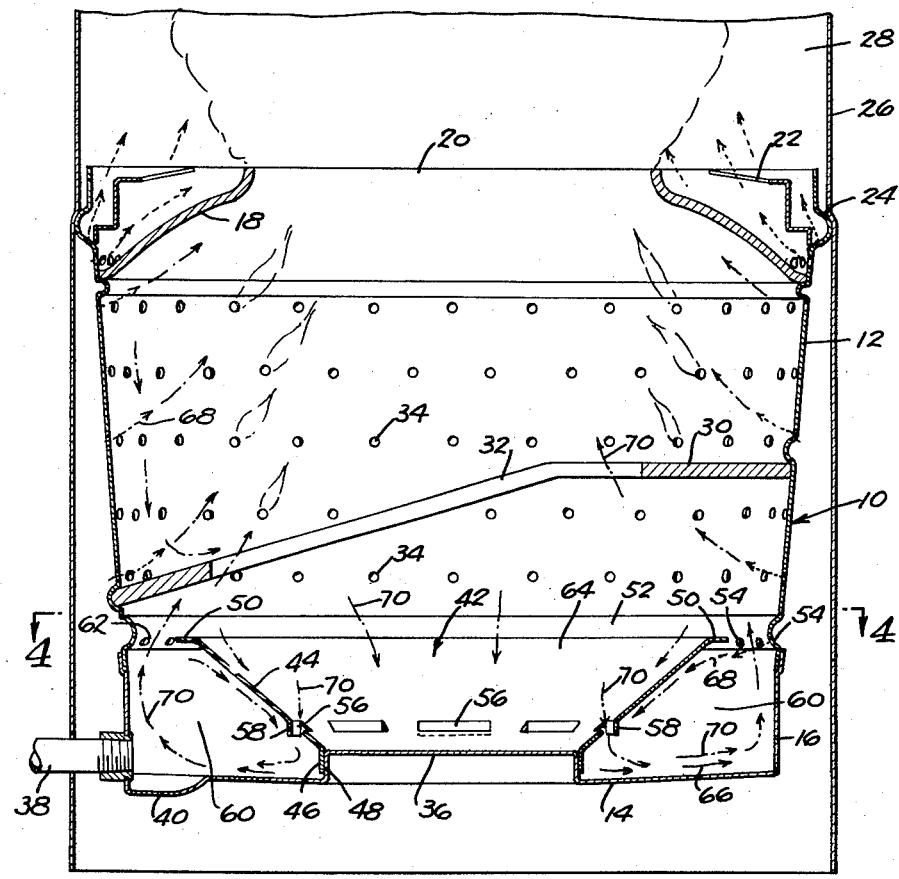
Fig. 1 is a fragmentary vertical sectional view through a burner of the present invention showing the operation at the high fire stage of combustion.
Figure 2:
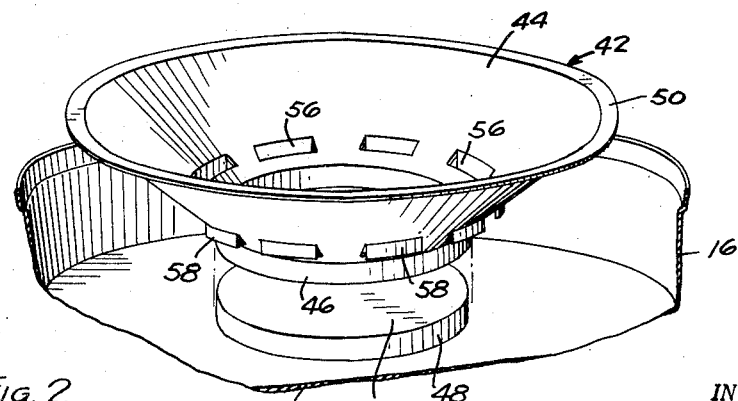
Fig. 2 is a fragmentary perspective view of the lower end of the burner pot showing the manner in which the baffle is arranged therein.

Referring to the drawings and particularly to Fig. 1, a vaporizing type oil burner pot is shown at 10. The burner pot 10 comprises two parts, a side wall 12 and a bottom portion which includes bottom wall 14 and bottom side wall 16. The upper edge of side wall 16 telescopically receives the lower edge of the side wall 12. Adjacent its upper end the burner pot 10 is provided with a generally conical top wall 18 having a central opening 20. An anti-explosion baffle 22 is positioned on top wall 18. An outwardly projecting annular bead 24 is formed adjacent the upper end of side wall 12. The bead 24 has a rather close fit with the skirt 26 which defines a combustion chamber 28 above the burner pot 10. Within the pot 10 and below top wall 18 there is arranged an inclined baffle 30 provided with a central opening 32. Side wall 12 is provided with vertically spaced rows of air inlet openings 34, some above, and others below, baffle 30.

Bottom wall 14 of the burner is generally flat and tapers slightly in an inward and downward direction. The central portion of bottom wall 14 is fashioned with a raised cylindrical portion 36 which cooperates with the bottom 14 and side wall 16 to define an annular channel for oil at the base of the burner pot. Oil is admitted to the burner through an inlet 38. In all forms of the burner the oil is supplied to inlet 38 through a conventional fuel oil control (not shown) which both meters and maintains the fuel oil at a constant level. Adjacent the inlet 38 the bottom wall 14 is formed with a depression 40 which provides a sump in which a small body of oil collects, particularly under minimum fire operation.

A baffle 42 is arranged at the bottom of the burner. Baffle 42 preferably takes the form of an inverted truncated cone and is provided with an inclined wall 44 which terminates at its lower end in a cylindrical upstanding flange 46 having a telescopic tight or close fit with the cylindrical side wall 48 of the raised central portion 36 of the bottom wall 14 of the burner. Inclined wall 44 of baffle 42 is provided around its upper edge with an annular horizontal flange 50.

The side wall 12 of the burner pot is provided adjacent its lower end with an inwardly projecting annular bead 52. A series of primary air inlet openings 54 are formed in bead 52. Openings 54 are arranged around the lower side of bead 52 with the central axes of these openings extending generally toward the wall 44 of baffle 42 so that the air flowing through these openings impinges in the form of air jets against, and is deflected downwardly by, the under side of wall 44.

Figure 10:
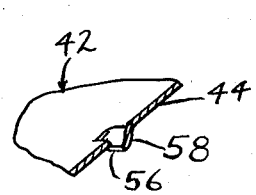
Fig. 10 is a fragmentary detail sectional showing of the conical baffle with a modified form of slot.
Figure 11:
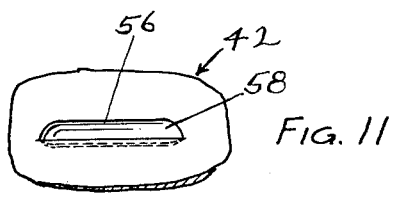
Fig. 11 is a fragmentary elevation of this slot as viewed from the inside of the baffle.

In the operation of the instant burner it is essential that communication be established between the chamber 60 and the inside of baffle 42 so that gases can flow from within the conical baffle into the mixing chamber 60 adjacent the lower end of the baffle. This communication between the area within the conical baffle 42 and the mixing chamber 60 can be established in several ways. By way of example, referring to Figs. 1 to 5, baffle 42 is provided adjacent its lower end with a series of rectangular slots 56. Slots 56 are arranged as an annular series spaced slightly above the central raised portion 36 of the bottom wall of the burner. Slots 56 preferably are formed in the conical wall of the baffle, as shown in Figs. 10 and 11, by shearing out the bottom edge only, thus forming a closed end louver 58. Slots 56 can also be formed (Figs. 1–5) by shearing the slots along their lower and side edges and bending the metal outwardly about the upper edges of these slots and thereby provide a generally vertically disposed flange or louver 58 depending from the upper edge of each slot and shielding the openings 56 from the air entering through inlets 54. Baffle 42 cooperates with bottom wall 14 and side walls 16 and 48 to define at the base of the burner pot an annular fuel vaporizing and mixing chamber 60 having a peripheral opening at its upper end in the form of an annular gap 62 defined by the outer edge of horizontal flange 50 and the inner face of bead 52.

In the operation of the burner, oil flows into the burner pot through the inlet 38 and spreads out as a thin layer over the bottom wall 14. The burner will operate on either natural draft or with mechanical or forced draft. Combustion chamber 26, 28 will be connected to a chimney flue in a conventional manner. Air flows into the lower end of the burner through the primary air inlet openings 54 and this air impinges in the form of jets or fingers against the under side of the inclined wall 44 of baffle 42. Wall 44 deflects this air downwardly towards the bottom wall 14 and the air then flows in a radially outward direction toward wall 16 over the surface of oil vaporizing on wall 14. The air thus mixes with the vaporized oil and the mixture flows upwardly adjacent the bottom side wall 16 through the annular gap or restriction 62 and then upwardly through the burner where it is mixed with further air and then burned. Observation of this burner in operation has disclosed that in general during operation above minimum fire a portion of the gases in the space 64 directly above and within baffle 42 recirculates, that is, flows downwardly from within conical baffle through slots 56 into chamber 60 where it mixes with the fuel-air mixture initially forming therein. The flanges or louvers 58 which depend from the upper edges of the rectangular slots 56 aid this circulation of air and oil vapor mixture and also prevent escape of the air-oil mixture from chamber 60 upwardly through slots 56. Baffle 42 thus insures an intimate mixing of the oil vapors with air. The baffle 42 also shields the air-oil mixture in chamber 60 from the radiant heat of the flame in the burner and thus promotes vaporization of the oil at a relatively low temperature.

Figure 3:
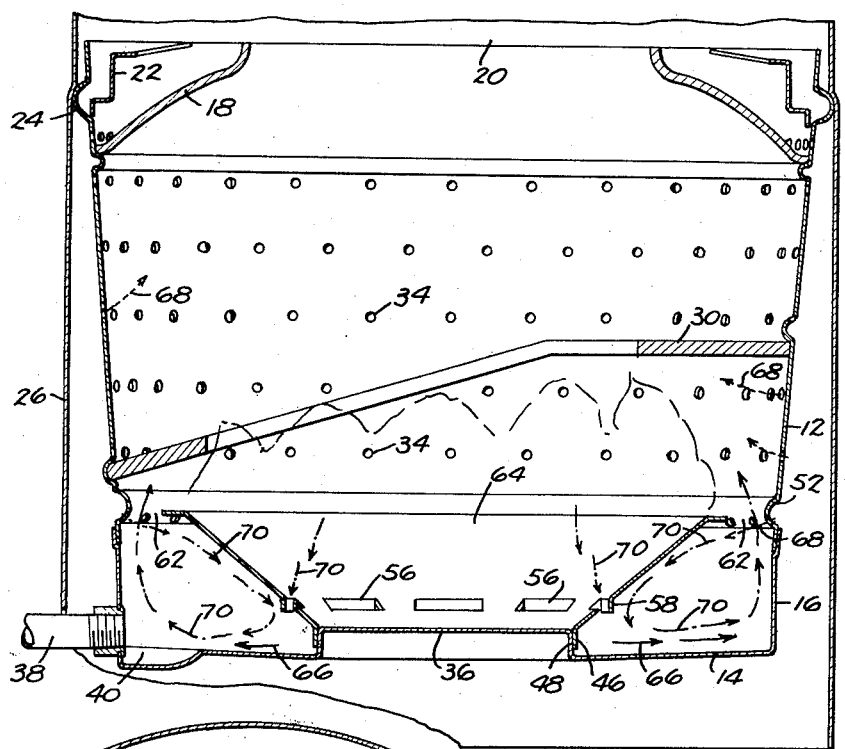
Fig. 3 is a view similar to Fig. 1 and showing the operation of the burner at the low fire stage of combustion.
Figure 4:
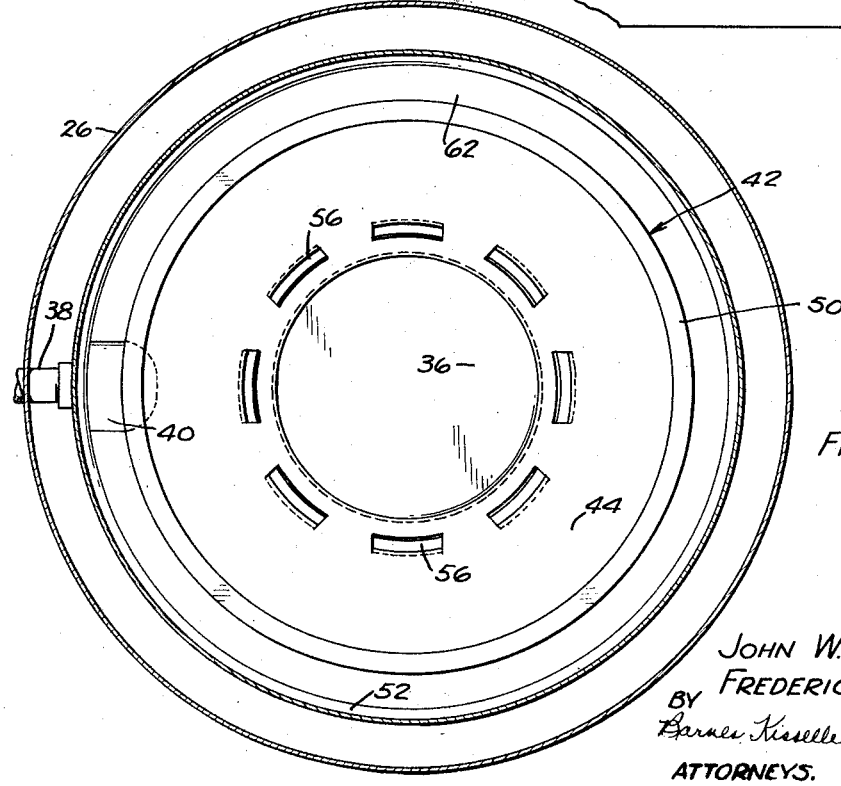
Fig. 4 is a horizontal sectional view taken along the line 4—4 of Fig. 1.

In an effort to illustrate more clearly the pattern of the flame, air flow and the flow of air-oil vapor mixture, arrows have been incorporated in Figs. 1 and 3 to generally depict this pattern. The arrows 66, formed with continuous solid lines, represent oil vapor; the arrows 68, formed with short broken lines, represent the flow of air; and the arrows 70, which are formed by broken lines of different lengths, represent the flow of air-oil vapor mixture.

Fig. 1, it will be observed, shows the high fire stage of combustion while Fig. 3 shows the same burner at a low fire stage of combustion, intermediate pilot and high fire. In the high fire stage of combustion, shown in Fig. 1, the oil flow through inlet 38 is substantially greater than the oil flow during low fire operation. Thus, the air-oil vapor mixture flowing from the mixing chamber 60 in Fig. 1 is richer than the air-oil vapor mixture flowing out of chamber 60 in Fig. 3. The rich mixture is mixed with the streams of air entering the burner through the air inlet openings 34 above and below baffle 30 and combustion occurs principally at the upper end, and above the outlet 20, of the burner in combustion chamber 28. At low fire operation, the air flowing into the burner through the air inlet openings 34 below baffle 30 dilutes the air-oil vapor mixture sufficiently to form a combustible mixture generally in the region of baffle 30 and combustion therefore occurs principally within the burner at, above, or below the central opening 32 of baffle 30 and below outlet 20. The construction shown in Figs. 1 and 3 is the same and the only difference between the showings of these figures is in the operation of the burner.

During both high and low fire operation of the burner the air entering the lower row of primary air inlet openings 54 flows into the burner in the form of jets. These jets of primary air are directed against the outer or under face of the baffle 42 so that the air flowing down the outer face of the baffle sweeps across the openings 56, thus establishing what can be considered a venturi action which draws the gases from within the conical baffle 42 through the slots 56 into the mixing chamber 60. The louvers or depending flanges 58 deflect the stream of air or air-oil vapor mixture flowing along the outside of the baffle downwardly toward bottom 14 whereupon the flow is radially outwardly to wall 16 and then upwardly. The jets of air entering the chamber 60 through inlets 54 preferably strike the outer side of the baffle 42 above the slots 56. However, the axes of the inlet opening 54 can be tilted and positioned relative to the outer face of baffle 42 so that the jets or stream of air is directed parallel to, and along the outside of, the baffle 42. One of the principal features is that the air stream should sweep down along the outside of the baffle 42 and be deflected away from the baffle by the louvers or baffles 58 to thereby insure a good venturi action which draws some of the gases from within the baffle 42 through the rectangular openings 56 for recirculation through and out of the mixing chamber 60. In actual practice it has been found practical, by way of example, to tilt the axes of the lower row of primary air holes 54 in the burner side wall at an angle of approximately 20° to the horizontal. The streams or jets of air that enter the lower row of holes 54 intermix with the vapor arising from the lower wall 14 of the mixing chamber and these streams of air, deflected downwardly and circulating across the bottom 14 over the oil film toward the outer periphery of the burner, pick up additional oil vapor and this air-oil vapor mixture then flows upwardly along the upper wall 16 and passes outwardly through the gap 62 between the pencils of air entering the lower row of holes 52.

Slots 56, together with the depending flanges 58, or the equivalent thereof, are necessary to produce efficient combustion with a clean fire. The provision of openings, such as the slots 56, substantially improve the operation of the burner. The gases which flow downwardly and outwardly through the slots 56 into the vaporizing and mixing chamber 60 prevent the formation of pockets of dead, motionless vapors, lower the density of the oil vapor fog by reason of dilution and help sweep the air-oil vapor mixture out of chamber 60 and into the main part of the burner through the annular gap 62. Furthermore, the heated gases which flow downwardly through the slots 56 supply additional heat to chamber 60 which helps promote oil vaporization. In addition, at low fire operation any air in the mixture of gases flowing into the mixing chamber through the slots 56, provides additional primary air for mixing with the oil vapors in chamber 60. It will be appreciated that unless means, such as the depending flanges 58, are provided for discouraging the movement of air outwardly of the mixing chamber through openings 56, the improved operation resulting from the provision of baffle 42 with the slots 56 would not be obtained.

The provision of the central raised portion 36 with its cylindrical side wall 48 is desirable from a structural or assembly standpoint also. It enables the baffle 42 to be telescoped over central portion 36 and it eliminates the necessity for prividing an oil-tight joint between baffle 42 and the bottom wall 14 of the burner, such as would be required if the baffle were welded or otherwise secured directly to the flat bottom wall 14 of the burner.

Figure 5:
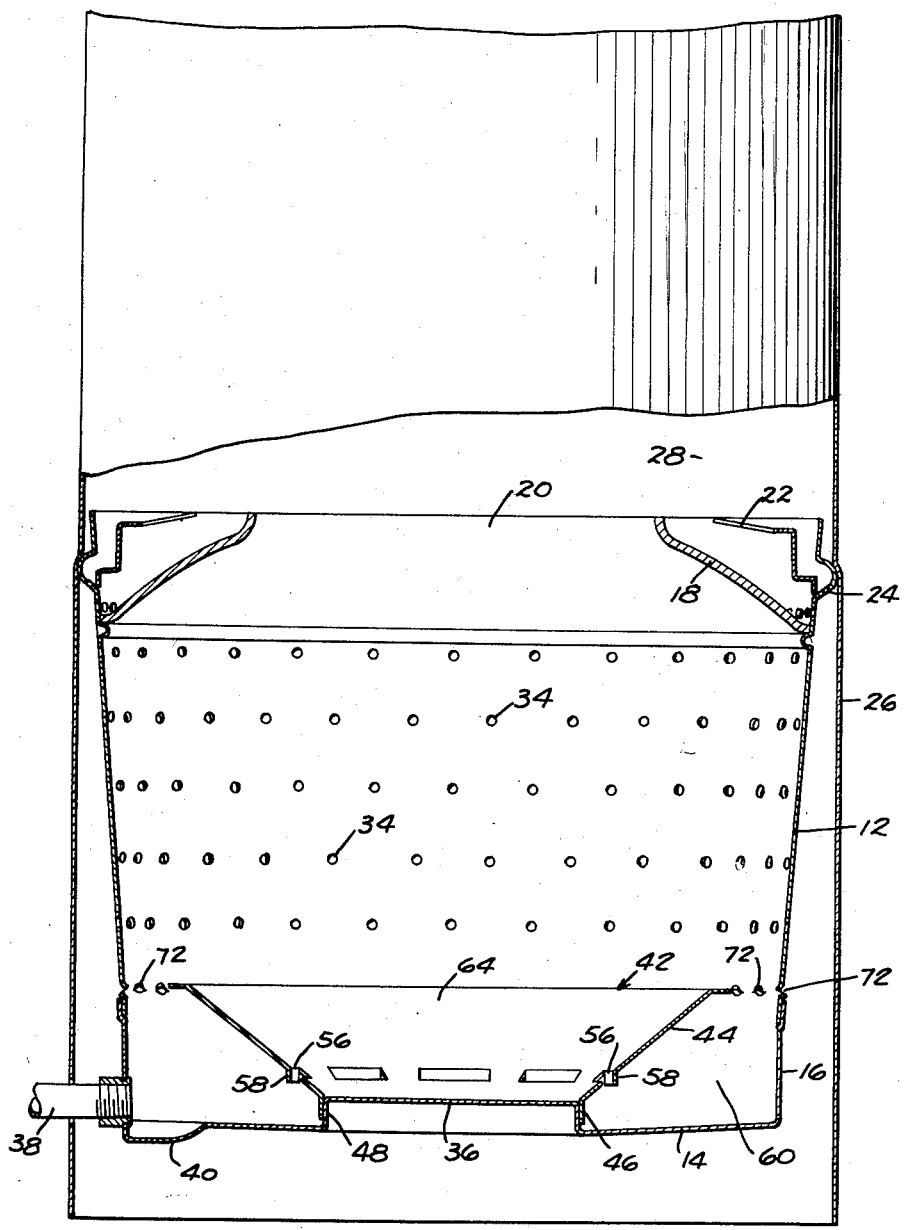
Fig. 5 is a generally sectional view of a modified form of burner construction of this invention.

The burner arrangement shown in Fig. 5 is generally the same as that illustrated in Figs. 1 to 4 with the exception, however, of a modified form of primary air inlet opening. In the arrangement shown in Fig. 5, these openings, designated 72, are formed by perforating the side wall 12 of the burner such that the metal around the upper half portion of the opening is bent inwardly and the metal around the lower half portion of the openings is bent outwardly. In this manner the axes of the openings are inclined downwardly in an inward direction so that the air streams flowing inwardly through these openings impinge against the under side of wall 44 of baffle 42 and are caused to circulate in chamber 60 in the same manner as described above with reference to Fig. 1. Also in the burner shown in Fig. 5, the inclined intermediate baffle 30 is omitted. It has been found that with the baffle 42 arranged as described, the provision of intermediate baffle 30, Fig. 1, although desirable in some instances, is not necessary to produce efficient and clean combustion.

Figure 6:
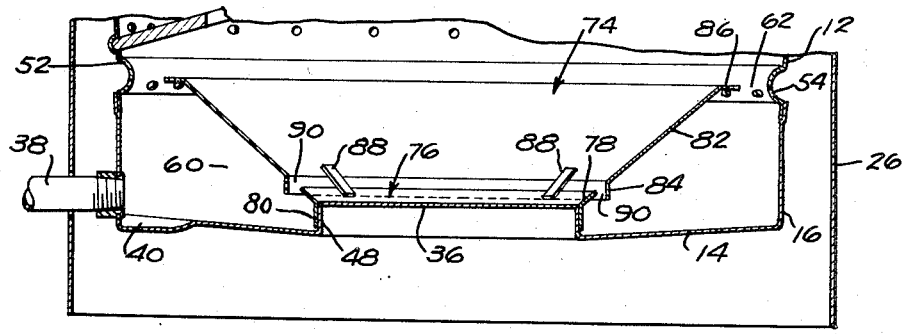
Figs. 6 and 7 show modified forms of baffle construction of this invention.
Figure 6A:
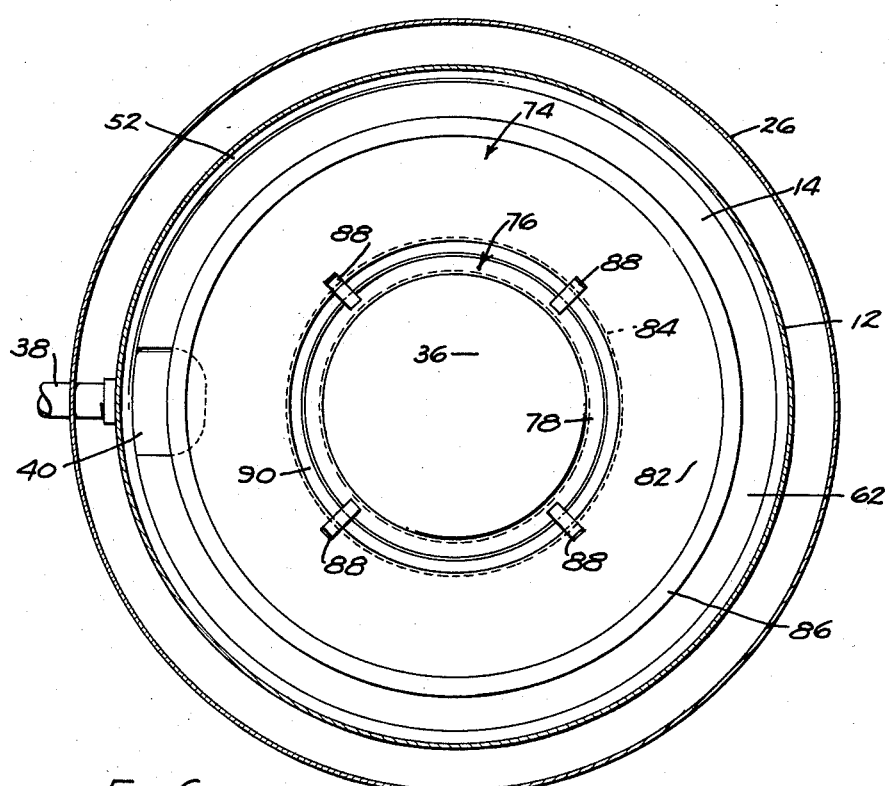
Figs. 6a and 7a are top plan elevations of the conical baffle arrangements shown respectively in Figs. 6 and 7.

In Fig. 6 there is shown a modified form of baffle for shielding the oil in the annular channel at the base of the burner from the radiant heat of the flame. The baffle includes two conically shaped members 74 and 76. The member 76 is fashioned with an inclined wall portion 78 and an upstanding cylindrical wall portion 80 which is adapted to be telescopically fitted with a tight or close fit over the side wall 48 of the central raised portion 36. The conical member 74 is fashioned with an inclined side wall portion 82 which terminates at its lower end in a vertically extending annular flange 84. At its upper end, wall 82 terminates in a peripheral horizontal flange 86. The two members 74 and 76 are held in assembled relation by any suitable means, such as welded clips 88. In assembled relation the member 74 is disposed over the member 76 with the flange 84 extending below the upper edge of inclined wall portion 78. The diameter of member 74 at the flange 84 is greater than the diameter of the member 76 at the upper edge of wall 78. Thus, there is provided an annular gap or slot 90 which extends continuously around the baffle between the members 74 and 76. This annular gap 90 and the depending flange 84 perform the same function as the slots 56 and the depending flanges 58 provided on the baffle shown in the embodiments of the invention previously described. The burner provided with the baffles as shown in Fig. 6 operates in substantially the same manner as described above with reference to Figs. 1 to 4.

Figure 7:
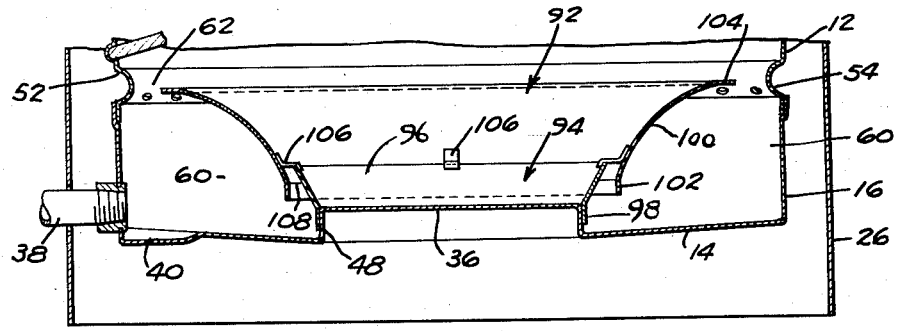
Figure 7A:
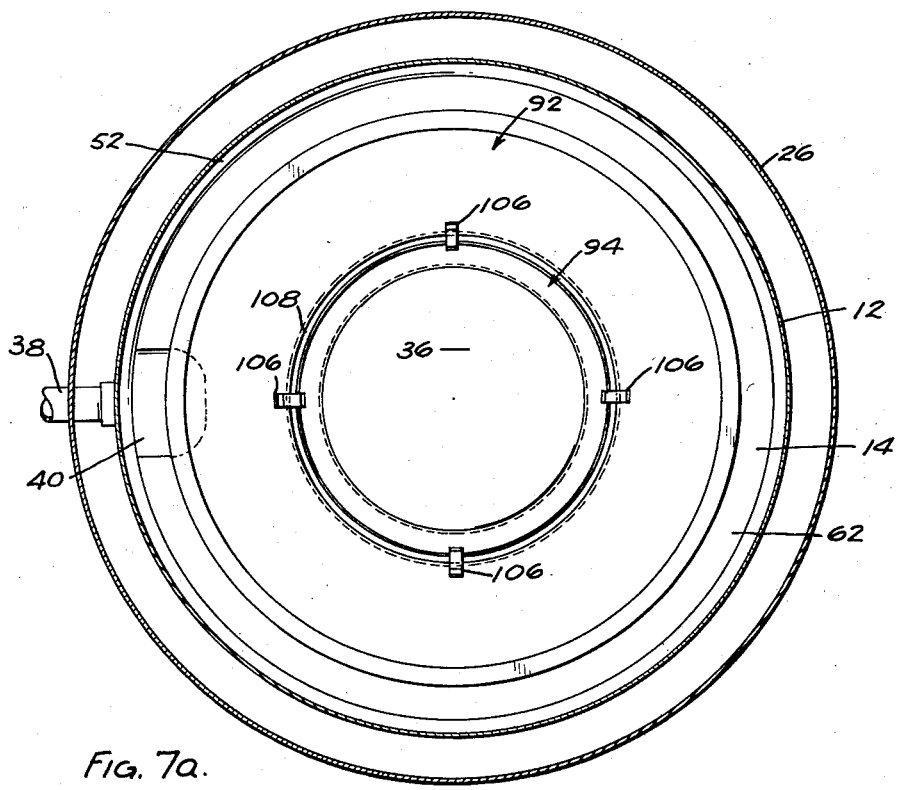
Figure 8:
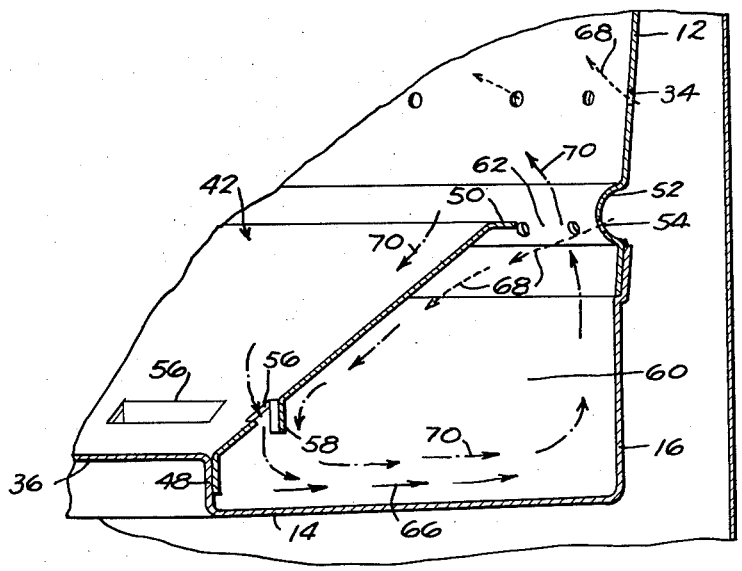
Fig. 8 is an enlarged showing of a portion of the vertical sectional view of the burner shown in Fig. 3 to more clearly illustrate the flow of air and oil vapors.

A second modified form of shielding baffle is shown in Fig. 7. This baffle comprises two members, an upper member 92 and a lower member 94, both of which are generally conically shaped. The lower member 94 is fashioned with an inclined side wall 96 which terminates at its lower end in a vertically disposed cylindrical wall 98 adapted to be telescopically fitted over the cylindrical wall 48 of the raised portion 36 of the bottom wall 14 of the burner. The upper member 92 includes a side wall 100 which is of arcuate vertical cross-section. At its lower end the arcuate side wall 100 terminates in a vertically disposed flange 102 and at its upper edge the arcuate side wall 100 terminates in a generally horizontally extending flange 104. The diameter of the upper member 92 at the cylindrical flange 102 is slightly greater than the diameter of the lower member 94 at the upper edge of the inclined wall 96. The baffle members 92 and 94 are arranged to be held in assembled relation by suitable spacer clips 106, with the wall 96 spaced radially inwardly of the wall 100 with its depending cylindrical flange 102 so as to provide an annular gap 108 between these two baffle members. Flange 102 overlaps wall 96 and terminates at a level in a plane below the upper edge of wall 96. This arrangement of the annular gap 108 provides a passageway for recirculating gases into vaporizing and mixing chamber 60 from the space above and within the baffle members 92 and 94 and the overlapping relation of flange 102 with respect to the wall 96 serves to discourage the escape of air-oil vapor mixture from chamber 60 through gap 108 in the same manner as described above with respect to slots 56 in the baffle 42, shown in Fig. 1.

Here again, as in the principal form of the invention, Figs. 1 through 5, the air fingers or jets entering the mixing chamber 60 through the primary air inlet openings 54 impinge against, and are deflected downwardly along, the outside of the conical baffles 74 and 92, Figs. 6 and 7, and flanges 84 and 102, respectively, deflect this air downwardly and tend to turn it radially outwardly along the bottom 14 of the burner. The sweep or flow of the fluid by flanges 84 and 102, respectively, creates a venturi action which draws the gases from within and above the conical baffles 74 and 92 through the gaps or annular slots 90 and 108, respectively, into the mixing chambers of the form of burner shown in Figs. 6 and 7 where it is again recirculated with the initial mixture forming in these mixing chambers. In all forms of the invention the conical baffle shields the liquid oil on the bottom wall 14 from direct radiation from the flame at low, intermediate and high fire, that is, any fire higher than minimum fire.

Slots 56, 90 and 108 in the baffle promote a very desirable low temperature vaporization of the oil. Two other structural features also promote low temperature vaporization of the oil; namely, the flat bottom 14 of the peripheral mixing chamber allows the incoming oil to spread out in a thin film over a large area and the raised center 36 absorbs heat radiated from the flame and conducts the heat in a direct unbroken path to the bottom 14. The structure embodying the raised center 36 with the conical baffle press fitted thereover is advantageous in that it avoids the need for an oil-tight joint between the bottom of the burner and the baffle.

Figure 9:
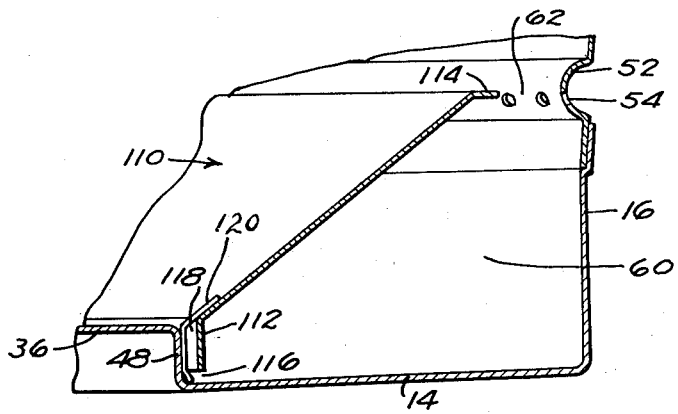
Fig. 9 is a fragmentary vertical section showing a modified form of baffle arrangement.

The baffle arrangement shown in Fig. 9 utilizes a baffle 110 similar to that shown in Fig. 6. Conical baffle 110 is provided with a cylindrical or peripheral flange 112 at its lower end and a peripheral or horizontal flange 114 at its upper end. The baffle 110 is positioned or fixed within the burner with flange 112 telescoped over the raised cylindrical portion 36 of the burner bottom 14. By way of illustration, baffle 110 has welded thereto a plurality of circumferentially spaced clips 120 which contact wall 48 and support the baffle 110 around raised portion 36 as shown. The lower edge of flange 112 is positioned above the bottom of the burner to provide a substantial clearance or gap 116 between the lower edge of the baffle and the bottom 14 of the burner. Flange 112 is also spaced from wall 48 to provide an annular gap or slot 118 between flange 112 and side wall 48. In this form of the invention, wall 48 acts as a part of the baffle.

This form of the burner operates the same as the burner shown in Figs. 6 and 7. Annular gaps or slots 118, 116 provide a communication through which gases flow from above and within conical baffle 110 into mixing chamber 60 in the same manner as described above with respect to slots 56, 90 and 108. The circulation of the gases in this form of the burner is the same as that described above with respect to the other forms of burner.

From the above it is evident that the baffle can be made in one or several parts. In the form of the invention shown in Figs. 1 to 5, the baffle 42 is made of one integral part whereas in the form of the invention shown in Figs. 6, 7 and 9, the baffles 74 and 90 are each made of two separate metal parts. However, in all forms of the invention the baffle is provided with a slot (56, 90, 108, 118) adjacent its lower edge to provide for the above-described flow or recirculation of gaseous mixture from within and above the baffle into the mixing chamber 60 and in all cases the slot or gap is shielded by a flange or louver (58, 84, 102, 112) which performs an essential function in the efficient operation of the burner as above described and illustrated in the drawings.

In all forms of the invention it should be noted that at low or intermediate fires such, for example, as is illustrated in Fig. 3, when the air-oil vapor mixture flows upwardly along the burner side wall 16 between or through the pencils or jets of primary air flowing into the burner through openings 54, these pencils or jets are furnishing secondary air to this mixture. Thus, air inlet openings 54 are a source of both primary and secondary air when the burner is operating at low or intermediate fire. Thus, referring to Fig. 3, at low fire the air-oil vapor mixture flowing through circumferential gap 62 between the upper edge of baffle 64 and wall 16 is a combustible mixture which has been supplied with secondary air in the manner above described.

We claim:

1. Combustion apparatus of the vaporizing type comprising an open top burner pot having a bottom wall and a side wall, means for directing oil onto said bottom wall, a baffle in said burner pot above said bottom wall, said baffle having an upper portion and a lower portion, there being a space between said upper portion and the burner side wall forming a relatively narrow gap adjacent said side wall which permits vapors below the baffle to flow into the space above the baffle, said lower portion of the baffle being disposed closely adjacent said bottom wall, said baffle being positioned with respect to the bottom wall and the adjacent portion of the side wall of the burner to provide a mixing chamber, primary air inlet means disposed generally at the level of the upper portion of said baffle for admitting air into said mixing chamber and directing the air in a direction adjacent the baffle and toward the bottom of the burner, a communication from the mixing or under side of said baffle to the other or upper side of said baffle, and means adjacent said communication and the lower portion of the baffle for deflecting the air entering the mixing chamber through the primary air inlet means downwardly past said communication toward the bottom of the burner whereby during the operation of the burner gas flows from above the burner through said communication into the mixing chamber and gaseous flow in the reverse direction through said communication is inhibited.

2. The combination claimed in claim 1 wherein said baffle is inclined downwardly and inwardly toward the bottom of the burner and the primary air inlet means comprises a plurality of inlet openings in the side wall of the burner.

3. The combination claimed in claim 2 wherein the center portion of the bottom wall is raised and the baffle is provided with a flange at its lower portion which overlaps the raised center portion of the bottom of the burner, said flange being spaced only slightly from said raised center portion and from the bottom of the burner to provide a communication between the mixing chamber and the space above the baffle and whereby the baffle substantially completely shields the oil on said bottom wall between said raised center portion and the side wall thereof.

4. The combination claimed in claim 3 wherein the baffle is frusto-conical and provided with a cylindrical flange at its lower portion and wherein the raised center portion of the burner bottom is provided with a cylindrical side wall which is positioned within and closely adjacent the annular flange on the baffle.

5. The combination claimed in claim 1 wherein said gap is of greater area than said communication.

6. The combination claimed in claim 1 wherein said primary air inlet means are disposed adjacent said gap and on the upstream side thereof so that the air admitted into said mixing chamber comes into immediate contact with the vapors flowing through said gap into the space above said baffle.

7. Combustion apparatus of the vaporizing type comprising an open top burner pot having a bottom wall and a side wall, means for directing oil onto said bottom wall, a baffle in said burner pot above said bottom wall, said baffle being inclined radially inwardly and downwardly from closely adjacent the burner side wall, at least a portion of the outer edge of said baffle being spaced from the burner side wall to provide a narrow gap therebetween which permits vapors to flow from below the baffle into the space above the baffle, the inner edge of said baffle comprising a depending flange which terminates in a plane spaced slightly above the bottom wall of the burner to provide a gap therebetween to permit vapors from the space above the baffle to flow into the space between the baffle and the bottom wall of the burner and air inlet openings in the burner side wall disposed at the level of said outer edge of the baffle for directing streams of air against or along the side of the baffle disposed towards said bottom wall, the downwardly inclined portion of said baffle and said flange serving to deflect air admitted through said inlet openings downwardly towards the bottom wall of the burner and said flange shielding said last mentioned gap to inhibit the flow of vapors in a reverse direction through said last mentioned gap.

8. The combination set forth in claim 7 wherein the bottom wall of said burner is provided with a raised central portion defining an annular oil channel below said baffle, said flange at the inner edge of said baffle being spaced radially outwardly from but closely adjacent said raised central portion.

9. The combination set forth in claim 7 wherein said first mentioned gap is of greater area than said second mentioned gap.

10. The combination set forth in claim 7 wherein said air inlet openings are disposed adjacent the spaced apart portions of the outer edge of said baffle and the side wall and on the upstream side thereof whereby the air admitted through said inlet openings comes into immediate contact with the vapors flowing through said narrow gap into the space above the baffle.

11. The combination set forth in claim 7 wherein said raised central portion includes a generally cylindrical side wall portion and said flange is generally cylindrically shaped, said last mentioned side wall portion and said flange being radially spaced apart to form a vertically extending annular slot therebetween, said slot communicating at its upper end with the space above said baffle and its lower end with said second mentioned gap.

References Cited in the file of this patent

UNITED STATES PATENTS

| 2,212,078 | Sabins | Aug. 20, 1940 |
| 2,241,470 | Miller | May 13, 1941 |
| 2,258,679 | Hayter | Oct. 14, 1941 |
| 2,290,544 | DeLancey | July 21, 1942 |
| 2,337,088 | Donley | Dec. 21, 1943 |
| 2,466,563 | Stempel et al. | Apr. 5, 1949 |
| 2,535,923 | Hill | Dec. 26, 1950 |

FOREIGN PATENTS

| 625,855 | Great Britain | July 5, 1949 |